United States Patent [19]

Fetzer et al.

[11] 3,964,357

[45] June 22, 1976

[54] DRIVE MECHANISM FOR A RECIPROCATING FEED

[75] Inventors: Helmut Fetzer, Goeppingen; Hans Braun, Weilheim-Teck; Günter Cieslok; Otto Rasenberger, both of Goeppingen, all of Germany

[73] Assignee: L. Schuler GmbH, Germany

[22] Filed: Jan. 31, 1975

[21] Appl. No.: 546,011

[30] Foreign Application Priority Data

Feb. 2, 1974  Germany............................ 2405123

[52] U.S. Cl..................................... 83/318; 74/53
[51] Int. Cl.²................................. B23D 25/02
[58] Field of Search..................... 83/318, 319, 320; 74/53, 25

[56] References Cited
UNITED STATES PATENTS

| | | | |
|---|---|---|---|
| 651,828 | 6/1900 | Copland | 74/53 X |
| 2,730,731 | 1/1956 | Schaefer | 74/53 X |
| 3,292,473 | 12/1966 | Couzens et al. | 83/318 |
| 3,383,929 | 5/1968 | Grutter | 74/53 |
| 3,394,600 | 7/1968 | Peterson | 74/53 |

FOREIGN PATENTS OR APPLICATIONS 2,129,589  12/1972  Germany .............................. 83/320

Primary Examiner—J. M. Meister
Attorney, Agent, or Firm—Craig & Antonelli

[57] ABSTRACT

Driving apparatus for imparting linear reciprocating movement to a shear on a flying shear apparatus or the like. A continuously constantly rotatable axle is provided with a pair of disks having cam surfaces on the periphery thereof engageable with guide rollers fixed at two lever arms of a three-armed lever, the third lever arm being connected to the flying shear by way of a coupling rod pivotably attached at the third lever arm and the flying shear. The cam disks are configured so as to impart motion to the shear in a feeding direction with a first feed segment of increasing velocity, a second feed segment of constant velocity, and a third feed segment of decreasing velocity, whereby the shearing operation can conveniently be executed during the phase of constant velocity. The cam surfaces are so constructed that motion of the shear in the return stroke direction includes a first return segment of increasing velocity and a second return segment of decreasing velocity, without the interposition of a constant velocity section.

12 Claims, 3 Drawing Figures

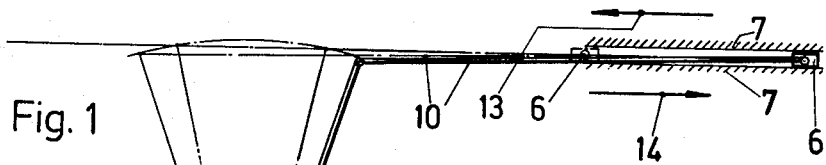
Fig. 1
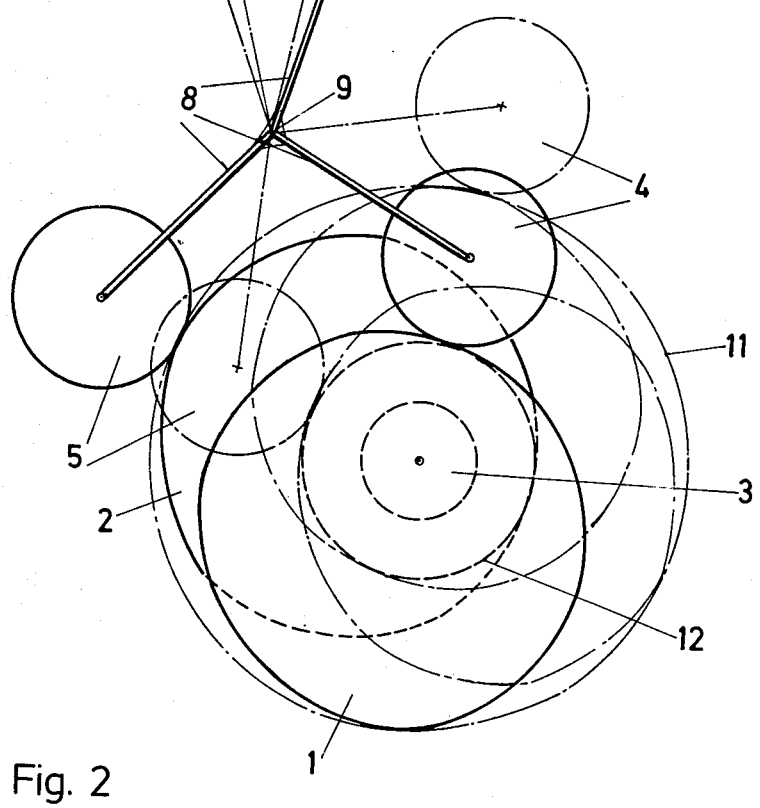
Fig. 2
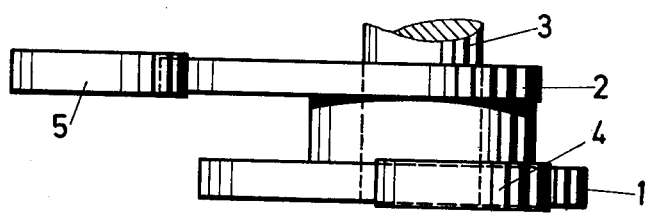

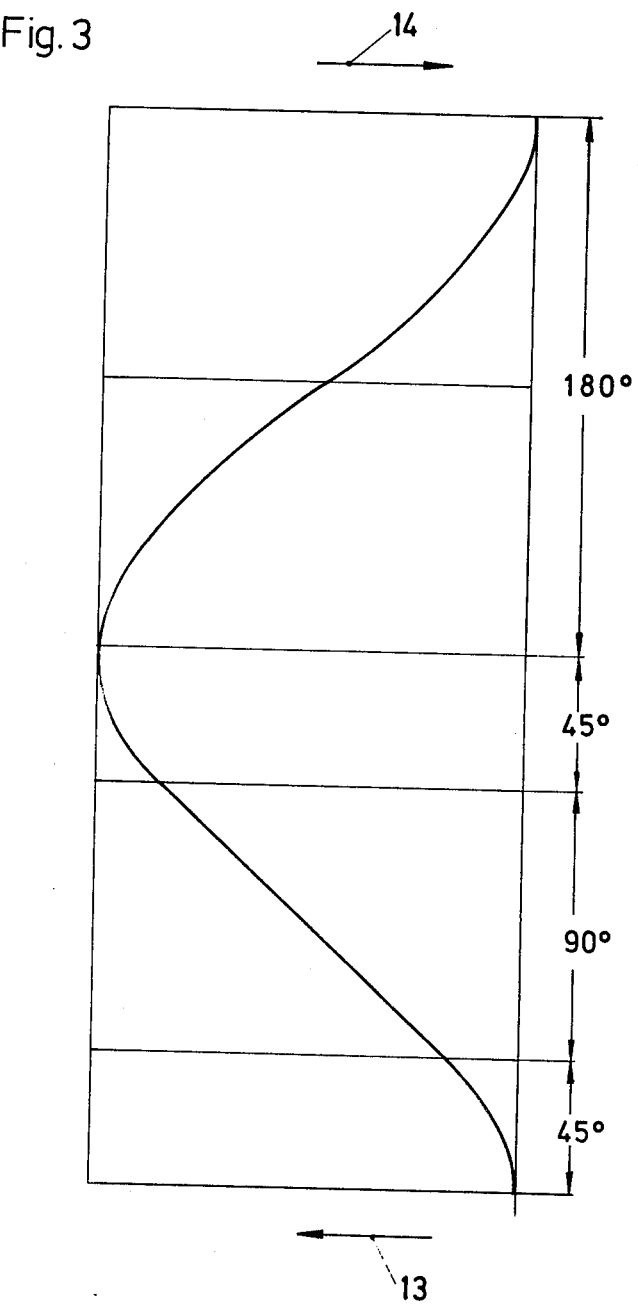

3,964,357

DRIVE MECHANISM FOR A RECIPROCATING FEED

BACKGROUND AND SUMMARY OF THE INVENTION

This invention relates to a drive mechanism for a reciprocating feed for a part, which drive mechanism includes a three-armed lever pivotably supported at a fixed point, one arm of this lever being in operative connection with the part to be fed, and the two other arms of this lever being arranged at an angle to each other and carrying rotatably mounted guide rollers which latter are in constant contact with drive disks rotatable together about a common axle.

A drive mechanism of this general type is described in German Unexamined Published Application (DOS) 2,153,991 which serves for the stepwise advancing of conveyor grippers which feed sheet-metal bands or strips to a press. In this German Application arrangement, an essential purpose to be fulfilled by the drive disks is to attain a course of motion of the conveyor grippers which has dwell intervals respectively at the two ends of a feeding step, during which dwell intervals other procedures, such as the opening and closing of the conveyor grippers, can be conducted.

This invention is based, at least in part, on the problem of making the advantages of the above-discussed type of drive mechanism, especially the positive drive transmission and the possibility of a practically no-play construction, available for the feed drive mechanism of a flying shear, and providing such a structure that the special kinematic conditions of the feed drive mechanism of a flying shear are taken into account.

The invention contemplates, in a drive mechanism of the type mentioned hereinabove, providing a construction such that the component to be advanced is a flying shear which executes during part of the feed path a movement in synchronism with the strip material to be severed, and that the effective radii of the drive disks vary constantly along the periphery so that, in the feeding direction, motion segments follow one another having an increasing, uniform, and decreasing velocity and, in the return stroke direction, motion segments follow one another having an increasing and a decreasing velocity.

A substantial advantage of the invention resides in that, while maintaining the positiveness of the drive transmission, it is possible in a simple manner, to obtain, in the feeding direction, a different speed curve along the feed path than in the return stroke direction. By the omission of a motion segment with a uniform speed in the return stroke direction, it is possible, for example, to limit the thus-occurring acceleration to a lower maximum value than in the feeding direction, whereby the existing forces of inertia can be reduced.

Preferred constructions of the drive mechanism of this invention, which are suitable for many purposes of application, provide that, in the feeding direction, respectively about 45° of the rotary angle of the drive disks is associated with the increasing speed and with the decreasing speed, and approximately 90° of the rotary angle of the drive disks is associated with the uniform speed and/or that, in the return stroke direction, respectively about 90° of the rotary angle of the drive disks is associated with each of the increasing speed and the decreasing speed. A simple connection of the drive mechanism of this invention with the flying shear is established by coupling one arm of the three-armed lever with the shear via a connecting rod which is articulated at both its ends. The flying shear is guided, in this arrangement, along a path in parallel to the direction of motion of the strip material.

These and further objects, features and advantages of the present invention will become more obvious from the following description when taken in connection with the accompanying drawings, which show, for purposes of illustration only, a single embodiment in accordance with the present invention.

BRIEF DESCRIPTION OF THE DRAWINGS

FIG. 1 is a lateral schematic side view which shows the principal members of a drive mechanism constructed in accordance with a preferred embodiment of the present invention;

FIG. 2 is a top schematic view showing the drive disks with their shaft and the guide rollers of the drive mechanism of FIG. 1; and FIG. 3 is a diagram of the feed path over the angle of rotation of the shaft carrying the drive disks of the drive mechanism of FIG. 1.

DETAILED DESCRIPTION OF THE DRAWINGS

The drawings and this description include those features which would enable one skilled in the art to practice the invention, other details of the flying shear apparatus being omitted in order not to obscure the present invention. Commonly assigned copending U.S. Pat. application Ser. No. 406,358, filed Oct. 15, 1973, now U.S. Pat. No. 3,881,382, issued May 6, 1975, and references cited in the file thereof, contain background information related to flying shear apparatus.

Drive disks 1 and 2 are connected to a shaft 3 of rotation therewith. This shaft 3 is coupled to a drive means which is in operative connection with the operating device for the cutting operation of a flying shear 6. Flying shear 6, only schematically depicted in the drawings, may be constructed similar to the shear depicted in FIG. 3 as linked cutter bars 2 and 3 in the above-noted U.S. Pat. No. 3,881,382. Since drive means and operating devices of conventional construction can be utilized with the invention, the details of same are not included in the drawings. Fixed guides 7 for the flying shear 6 extend in parallel to the direction of motion of the strip material to be divided or cut — likewise not shown in the drawing.

A three-armed lever 8 is provided which is pivotably supported at a fixed point 9 and is connected with one arm — shown in the drawing as pointing upwardly — via the coupling rod 10, which is articulated at both of its ends, to the flying shear 6. Two guide rollers 4 and 5 are freely rotatably mounted to the two other arms of the three-armed lever 8, these arms being arranged at an angle to each other. The two guide rollers 4, 5 are in constant contact with the peripheral surfaces of the respective drive disks 1 and 2.

The pivoting motions of the three-armed lever 8 are carried out between end positions defined, on the one hand, by the perimeter 11 and, on the other hand, by the inscribed circle 12 of all rotational positions of the two identical drive disks 1 and 2, attached mutually offset to the shaft 3. The two terminal positions of the reciprocating feeding motion of the flying shear 6 correspond to these end positions. The solid line depiction of lever 8 and rollers 4 and 5 corresponds to the extreme rightward position of flying shear 6, while the dot-dash line depiction of rollers 4 and 5 corresponds to the extreme leftward position of flying shear 6. The upwardly extending arm of lever 8 is schematically shown in two intermediate positions, as well as the extreme leftward position in dot-dash lines.

The effective radii of the two drive disks 1 and 2 vary constantly along the periphery so that motion segments follow one another in the feeding direction 13 with an increasing speed, a uniform speed, and a decreasing speed, and so that motion segments follow one another in the return stroke direction 14 with an increasing speed and with a decreasing speed. In this connection, an angle of rotation of the shaft 3 of respective 180° is associated with the feeding direction 13 and with the return stroke direction 14 such that a complete revolution of shaft 3 results in a complete feed and return stroke. The intermediate illustrated positions of the upper arm of the three-armed lever 8 (attached to rod 10) depict the motion segment wherein, in the feeding direction 13, a uniform speed of motion of the flying shear 6 is provided, representing a movement in synchronism with the strip material to be severed. During this motion segment, the strip material is cut by the flying shear 6. The peripheral cam surface of disks 1 and 2 is to be derived using the desired displacement arm for rod 10 and shear 6 as shown in FIG. 3.

While we have shown and described one embodiment in accordance with the present invention, it is understood that the same is not limited thereto but is susceptible of numerous changes and modifications as known to those skilled in the art and we therefore do not wish to be limited to the details shown and described herein but intended to cover all such changes and modifications as are encompassed by the scope of the appended claims.

We claim:

1. Driving apparatus for imparting movement to a component such as a flying shear or the like, comprising:
    a rotatably drivable axle
    a first control disk carried by and rotatable with said axle, said first disk having a first cam surface thereon,
    a second control disk carried by and rotatable with said axle, said second dish having a second cam surface thereon,
    a lever having first, second and third lever arms extending from a common lever pivot axis in respective different directions,
    pivot means pivotally supporting said lever at the lever pivot axis,
    said first and second lever arms extending at different angles from said lever pivot axis and including respective cam followers engageable with the respective first and second cam surfaces, said first and second cam surfaces including means for imparting a predetermined pivotal movement of said lever upon rotation of said axle,
    linkage means interconnecting said third lever arm with a component, said lever including means for imparting movement to said component upon pivotal movement of said lever,
    and component guide means for guiding the movement of said component in a feeding direction and a substantially opposite return stroke direction,
    wherein said first and second cam surfaces include means for imparting sequential movement to said component during rotation of said axle, in said feeding direction with a first feed segment of increasing velocity, a second feed segment of constant velocity, and a third feed segment of decreasing velocity, and in said return stroke direction with a first return segment of increasing velocity, and a second return segment of decreasing velocity, without the interposition of a constant velocity return segment similar to said second feed segment between said first and second return segments.

2. Apparatus according to claim 1, wherein said first and second cam surfaces include means for, repeatedly moving said component through said mentioned sequence of movements with a constant speed rotation of said axle.

3. Apparatus according to claim 2, wherein said first and second cam surfaces are formed at the periphery of the respective first and second disks, and wherein said cam followers are respective guide rollers rotatably supported respectively at said first and second lever arms.

4. Apparatus according to claim 3, wherein said guid rollers are in continual contact with said cam surfaces during rotation of said axle guiding and controlling the pivotal movement of the lever at all times.

5. Apparatus according to claim 4, wherein each of said first and third feed segments are associated with approximately 45° rotation of the disks and said second feed segment is associated with approximately 90° rotation of the disks.

6. Apparatus according to claim 5, wherein each of said first and second return segments are associated with 90° rotation of the disks.

7. Apparatus according to claim 4, wherein each of said first and second return segments are associated with 90° rotation of the disks.

8. Apparatus according to claim 4, wherein said linkage means includes a coupling rod having one end pivotally attached to said component and the other end pivotally attached to the third lever arm.

9. Apparatus according to claim 6, wherein said linkage means includes a coupling rod having one end pivotally attached to said component and the other end pivotally attached to the third lever arm.

10. Apparatus according to claim 9, wherein said component is a shear of a flying shear apparatus, wherein said guide means guides said shear for movement in a direction parallel to the direction of movement of material to be cut which is fed to said shear apparatus, and wherein said shear apparatus includes means for shearing said material when said shear is experiencing said second feed segment of constant velocity.

11. Apparatus according to claim 1, wherein said first and second cam surfaces include means for imparting movement to said component in said return stroke direction without any constant velocity return segment between said first and second return segments.

12. Apparatus according to claim 10, wherein said first and second cam surfaces include means for imparting movement to said component in said return stroke direction without any constant velocity return segment between said first and second return segments.

* * * * *